US011454576B2

(12) United States Patent
Lev-Sagie et al.

(10) Patent No.: US 11,454,576 B2
(45) Date of Patent: Sep. 27, 2022

(54) ASSAY APPARATUS AND HANDHELD SPECIMEN COLLECTION TOOLS THEREFOR

(71) Applicant: Gyntools Ltd, Jeruslaem (IL)

(72) Inventors: Menachem Lev-Sagie, Lapid (IL); Nimrod Lev, Savion (IL)

(73) Assignee: GYNTOOLS LTD, Jerusalem (IL)

( * ) Notice: Subject to any disclaimer, the term of this patent is extended or adjusted under 35 U.S.C. 154(b) by 0 days.

(21) Appl. No.: 17/611,622

(22) PCT Filed: Jun. 11, 2020

(86) PCT No.: PCT/IL2020/050647
§ 371 (c)(1),
(2) Date: Nov. 16, 2021

(87) PCT Pub. No.: WO2020/250227
PCT Pub. Date: Dec. 17, 2020

(65) Prior Publication Data
US 2022/0244147 A1   Aug. 4, 2022

(30) Foreign Application Priority Data
Jun. 12, 2019   (IL) .......................... 267301

(51) Int. Cl.
*G01N 1/00* (2006.01)
*G01N 1/28* (2006.01)
*G01N 1/02* (2006.01)

(52) U.S. Cl.
CPC ............. *G01N 1/2813* (2013.01); *G01N 1/02* (2013.01); *G01N 2001/028* (2013.01)

(58) Field of Classification Search
None
See application file for complete search history.

(56) References Cited

U.S. PATENT DOCUMENTS

| 4,190,314 A | 2/1980 | Goldsmith |
| 5,428,470 A | 6/1995 | Labriola, II |

(Continued)

FOREIGN PATENT DOCUMENTS

| AU | 2005240757 B2 | 2/2011 |
| KR | 20140140068 A | 12/2014 |

(Continued)

OTHER PUBLICATIONS

Supplementary Search Report dated Feb. 18, 2021 in EP Application No. 18819634.9.

(Continued)

*Primary Examiner* — Jyoti Nagpaul
(74) *Attorney, Agent, or Firm* — Panitch Schwarze Belisario & Nadel LLP

(57) ABSTRACT

Assay apparatus for use with a handheld specimen collection tool having an elongated specimen collection tip for bearing bodily specimen therealong. The assay apparatus includes a drum having a transparent, generally cylindrical, hollow drum body with a horizontal longitudinal drum body centerline, an internal drum body surface and an external drum body surface and a backlight illuminator for backlighting the drum body. The assay apparatus includes an elongated specimen collection tube for snug sliding insertion of the elongated specimen collection tip thereinto for depositing bodily specimen on the drum body and an elongated scanner for scanning the backlighted drum body for acquiring a bodily specimen scan.

17 Claims, 11 Drawing Sheets

(56) References Cited

U.S. PATENT DOCUMENTS

| | | | |
|---|---|---|---|
| 5,760,315 A | 6/1998 | Verheijden et al. |
| 6,170,318 B1 | 1/2001 | Lewis |
| 6,316,205 B1 | 11/2001 | Guan et al. |
| 7,434,986 B2 | 10/2008 | Ignatowicz |
| 7,434,988 B1 | 10/2008 | Kychakoff et al. |
| 8,371,182 B1 | 2/2013 | Israelachvili |
| 9,222,935 B1 | 12/2015 | Bransky et al. |
| 9,265,580 B2 | 2/2016 | Speck et al. |
| 9,518,920 B2 | 12/2016 | Fine et al. |
| 2002/0182739 A1 | 12/2002 | Sadik et al. |
| 2007/0202564 A1 | 8/2007 | Glasson et al. |
| 2008/0188769 A1 | 8/2008 | Lu |
| 2009/0030342 A1 | 1/2009 | Flanigan et al. |
| 2011/0021950 A1 | 1/2011 | Daniels |
| 2012/0031605 A1 | 2/2012 | Takayama et al. |
| 2012/0157878 A1 | 6/2012 | Mendez |
| 2012/0288890 A1 | 11/2012 | Oouchi |
| 2013/0211288 A1 | 8/2013 | Zwart |
| 2013/0338533 A1 | 12/2013 | Olsen |
| 2015/0004717 A1 | 1/2015 | Mcdevitt et al. |
| 2015/0094219 A1 | 4/2015 | Trowell et al. |
| 2016/0186240 A1 | 6/2016 | Andreyev et al. |
| 2017/0209865 A1 | 7/2017 | Carrano et al. |
| 2018/0070928 A1* | 3/2018 | Jones ............... A61B 5/6861 |
| 2019/0120727 A1 | 4/2019 | Harding et al. |
| 2019/0233888 A1 | 8/2019 | Wunderle et al. |
| 2020/0132703 A1 | 4/2020 | Lev-Sagie et al. |

FOREIGN PATENT DOCUMENTS

| | | |
|---|---|---|
| WO | 2005108604 A2 | 11/2005 |
| WO | 2012033796 A2 | 3/2012 |
| WO | 2013078014 A1 | 5/2013 |
| WO | 2013134179 A2 | 9/2013 |
| WO | 2017001922 A1 | 1/2017 |
| WO | 2018235073 A1 | 12/2018 |

OTHER PUBLICATIONS

Int'l Search Report and Written Opinion dated Oct. 8, 2020 in Int'l Application No. PCT/IL2020/050647.

Int'l Search Report dated Feb. 11, 2021 in Int'l Application No. PCT/IL2020/051116.

* cited by examiner

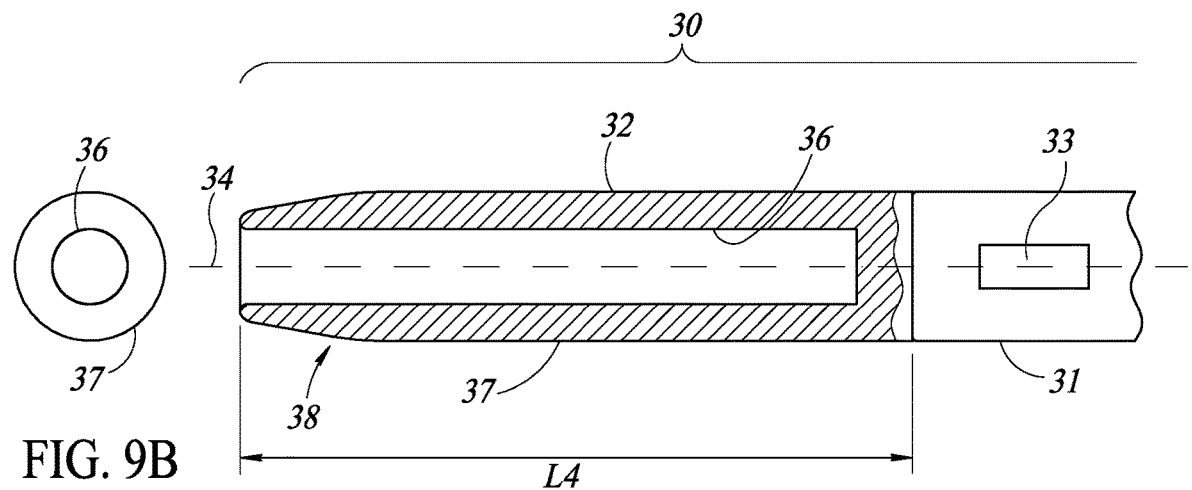
FIG. 9B
FIG. 9C
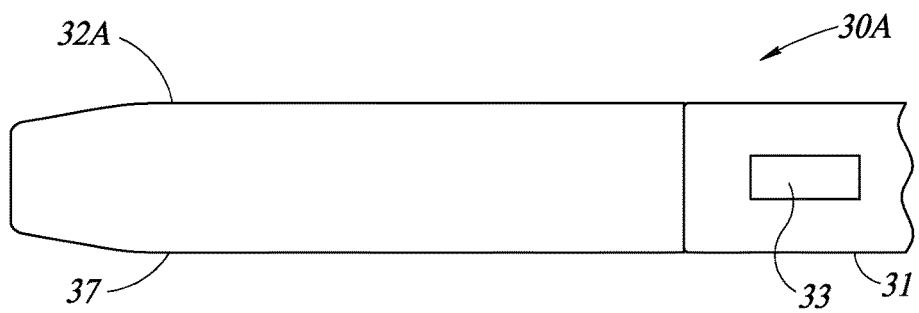
FIG. 10

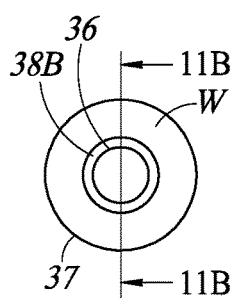
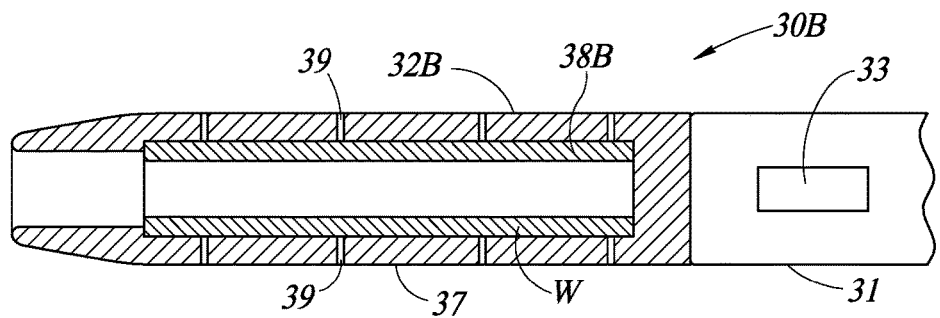
FIG. 11A  FIG. 11B
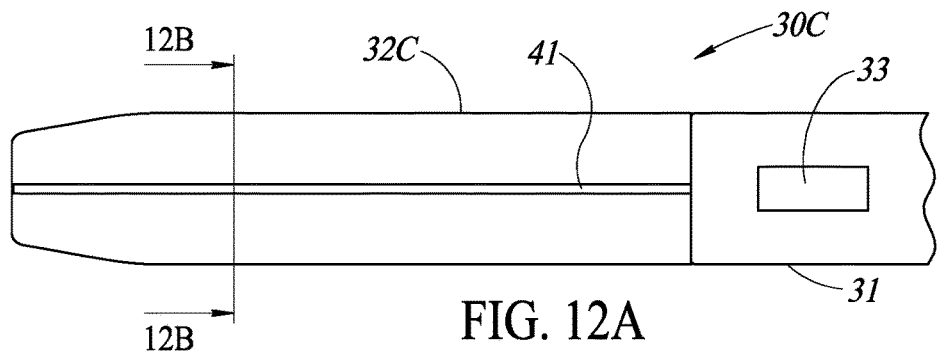
FIG. 12A
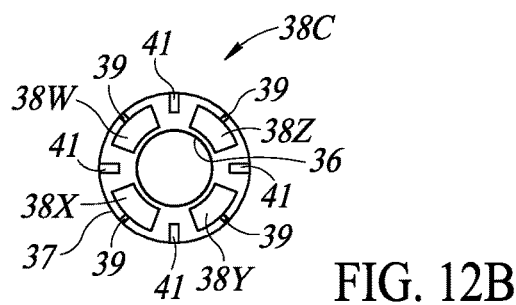
FIG. 12B
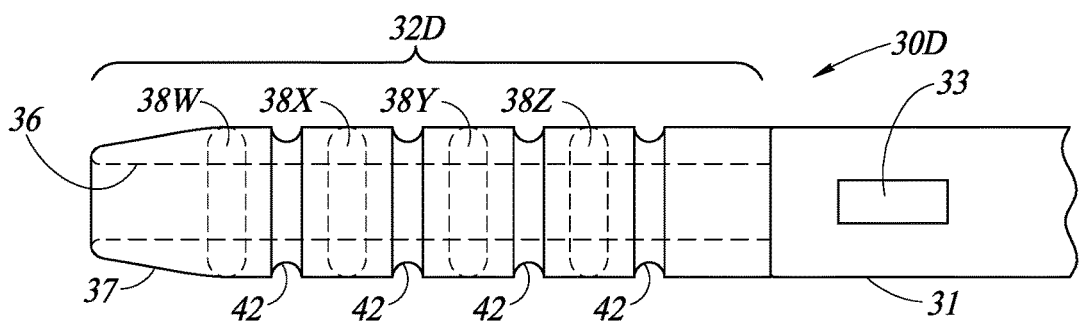
FIG. 13

US 11,454,576 B2

ASSAY APPARATUS AND HANDHELD SPECIMEN COLLECTION TOOLS THEREFOR

CROSS-REFERENCE TO RELATED APPLICATIONS

This application is a Section 371 of International Application No. PCT/IL2020/050647, filed Jun. 11, 2020, which was published in the English language on Dec. 17, 2020, under International Publication No. WO 2020/250227 A1, which claims priority under 35 U.S.C. § 119(b) to Israeli Application No. 267301, filed on Jun. 12, 2019, the disclosures of which are incorporated herein by reference in their entireties.

FIELD OF THE INVENTION

This invention relates to assay apparatus and handheld specimen collection tools therefor.

BACKGROUND OF THE INVENTION

Assays are part of multiple step investigative procedures for qualitatively assessing or quantitatively measuring the presence, amount, or functional activity of one or more specimens. Assays include pre- and post-analytic procedures. Pre-analytic steps include inter alia specimen collection and handling, information collection and processing, and the like. Post-analytic steps include inter alia information storage, report documentation, report transmission, and the like. Assays can be employed for investigating chemical specimens, biological specimens, organic specimens and non-organic specimens. Specimens can be solid, liquid, gel and the like. Investigations can include naked eye visual examinations, naked eye optical examinations using optical apparatus, for example, microscopes, and the like. Investigations can include digital scanning in different modalities including inter alia visible light, IR, UV, ultrasound, X-ray and the like for image processing purposes.

Commonly owned PCT International Application No. PCT/IL2018/050671 published as PCT International Publication No. WO 2018/235073 entitled Assay Devices and Assay Apparatus for Use Therewith discloses assay devices for EMR examination of a specimen along a line of examination through an assay device. WO 2018/235073 FIG. 18 to FIG. 21 disclose an assay device for use with assay apparatus typically in the form of a digital microscope. Assay apparatus can be a standalone device with built-in information collection and diagnosis capabilities for examining a specimen. The specimen is preferably reacted with one or more reagents, for example, saline, potassium hydroxide, and the like. Alternatively, assay apparatus can transmit scans and other information acquired from a reacted bodily specimen for remote processing.

There is a need for assay apparatus for acquiring reacted bodily specimen scans for image processing purposes and handheld specimen collection tools therefor.

SUMMARY OF THE INVENTION

The present invention is directed towards assay apparatus for use with handheld specimen collection tools having an elongated specimen collection tip for obtaining a bodily specimen from a bodily orifice or an exposed bodily surface. Some embodiments of assay apparatus of the present invention are designed for use with presently commercially available specimen collection tools including inter alia a brush, swab, and the like. Other embodiments of assay apparatus of the present invention are designed for use with purpose-built specimen collection tools. Bodily orifices include inter alia facial orifices, urethra, rectum, and vagina. Exposed bodily surfaces include inter alia a skin eruption, a skin efflorescence, an open wound, lips, eyes, and the like.

Assay apparatus of the present invention includes a housing having a drum with a transparent, generally cylindrical hollow drum body having a horizontal longitudinal drum body centerline. The drum body has an internal drum body surface and an external drum body surface and is backlighted by a backlight illuminator. The backlight illuminator is preferably deployed inside the drum body. The housing includes a specimen collection tube for snug sliding insertion of an elongated specimen collection tip thereinto for depositing bodily specimen on the drum body co-directional with the horizontal longitudinal drum body centerline. The housing includes an elongated scanner co-extensive with the drum body for scanning at least some of the backlighted drum body for acquiring a typically reacted bodily specimen scan pursuant to reaction of bodily specimen with at least one reagent. Assay apparatus can include scanning can be in one or more different EMR modalities including inter alia visible light, IR, UV, X-ray and the like.

The present invention employs snug sliding insertion of an elongated specimen collection tip for depositing bodily specimen on an internal or external drum body surface. Bodily specimens can be reacted with one or more reagents for diagnosis purposes. Reagents can be solid reagents, powder reagents, liquid reagents, gel reagents, and the like. In the case of two or more reagents, reacted bodily specimen deposits can be aligned either transverse to a horizontal longitudinal drum body centerline or co-directional therewith. Adjacent reacted bodily specimen deposits of an adjacent reacted bodily specimen deposit pair are preferably spaced apart to avoid overlapping of adjacent reacted bodily specimen deposits. Such spacing apart also precludes potential unwanted reaction of adjacent reagents should they mix.

Assay apparatus of the present invention for use with presently commercially available handheld specimen collection tools include a specimen collection tube with scrapers for scraping bodily specimen from a specimen collection tip before scanning. Purpose-built handheld specimen collection tools include an elongated hollow specimen collection tip having a longitudinal specimen collection tip centerline, an internal peripheral specimen collection tip surface and an external peripheral specimen collection tip surface. Assay apparatus of the present invention for use with a purpose-built handheld specimen collection tool includes a drum body which doubles as a specimen collection tube and a backlight illuminator which is intended to be snugly slidingly inserted into an elongated hollow specimen collection tip simultaneously on snug sliding insertion of the elongated hollow specimen collection tip into a drum body cum specimen collection tube.

Assay apparatus of the present invention can be implemented as standalone equipment with a built-in power supply and a built-in user interface. Alternatively, assay apparatus of the present invention can be designed for use with a discrete computing device for employing the discrete computing device's power supply and user interface. Suitable discrete computing devices include inter alia a smartphone, a tablet, a laptop computer, and the like. Bodily specimen scans can be processed by either on-board or cloud based image processing functionality. Assay apparatus of the present invention can be implemented as single use disposable devices. Alternatively, assay apparatus of the present invention can be implemented as multi-use devices with interchangeable parts for each bodily specimen collection and subsequent scanning.

BRIEF DESCRIPTION OF DRAWINGS

In order to understand the invention and to see how it can be carried out in practice, preferred embodiments will now be described, by way of non-limiting examples only, with reference to the accompanying drawings in which similar parts are likewise numbered, and in which:

FIG. 9B is an end elevation view of the FIG. 9A specimen collection tool;

FIG. 9C is a partial longitudinal cross section of the FIG. 9A specimen collection tool along line 9C-9C in FIG. 9A;

FIG. 10 is a side elevation view of a basic purpose-built handheld specimen collection tool;

FIG. 11A is an end elevation view of one embodiment of a purpose-built handheld specimen collection tool with an integral single reagent dispenser;

FIG. 11B is a longitudinal cross section of the FIG. 11A specimen collection tool along line 11B-11B in FIG. 11A;

FIG. 12A is a side elevation view of another embodiment of a purpose-built handheld specimen collection tool with an integral multiple reagent dispenser;

FIG. 12B is a transverse cross section of the FIG. 12A specimen collection tool along line 12B-12B in FIG. 12A;

FIG. 13 is a side elevation view of yet another embodiment of a purpose-built handheld specimen collection tool with an integral multiple reagent dispenser;

DETAILED DESCRIPTION OF DRAWINGS

Figure 1:
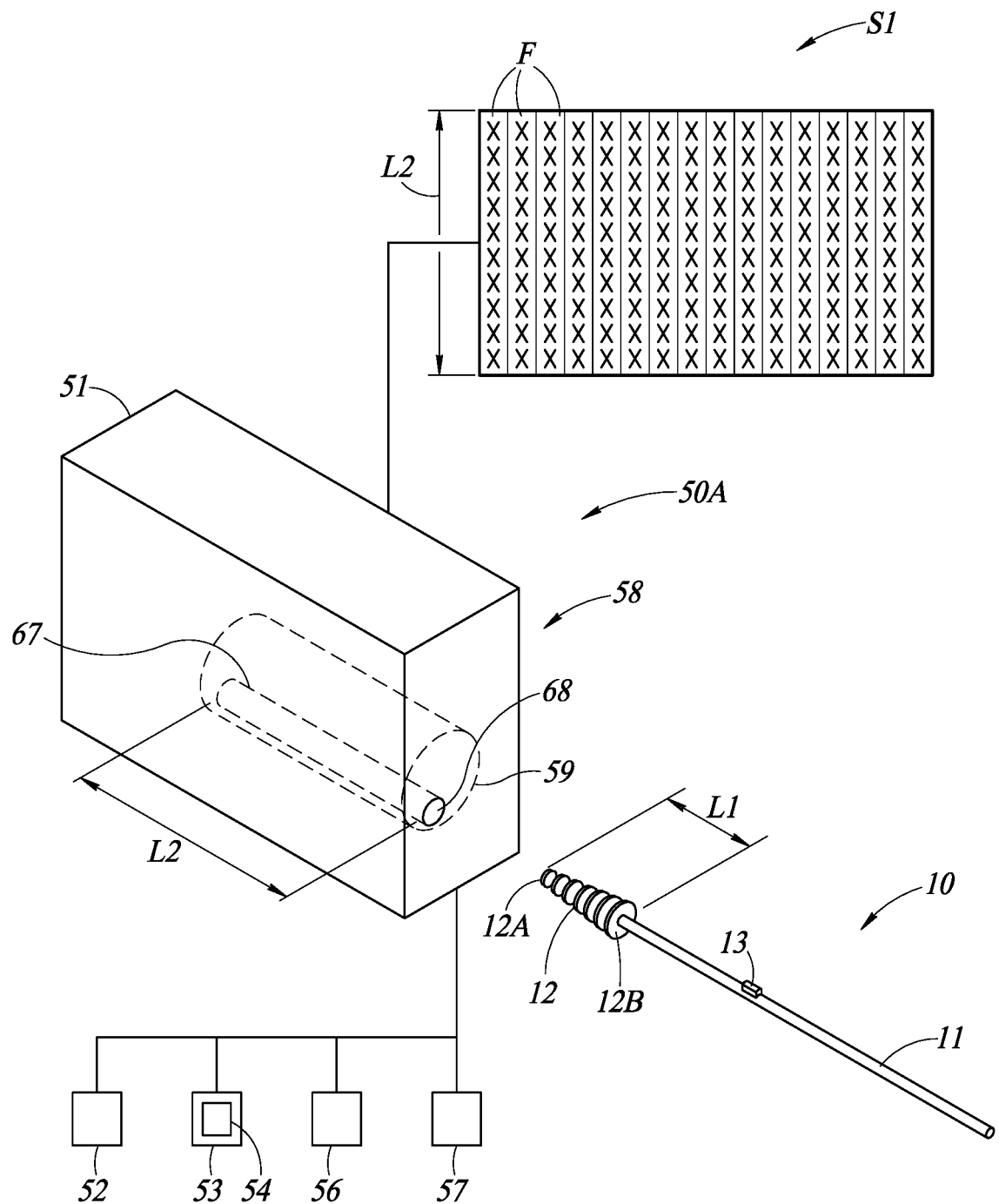
FIG. 1 is a combined schematic view and block diagram of a standalone rotary drum assay apparatus for use with a conventional handheld specimen collection tool.
Figure 2:
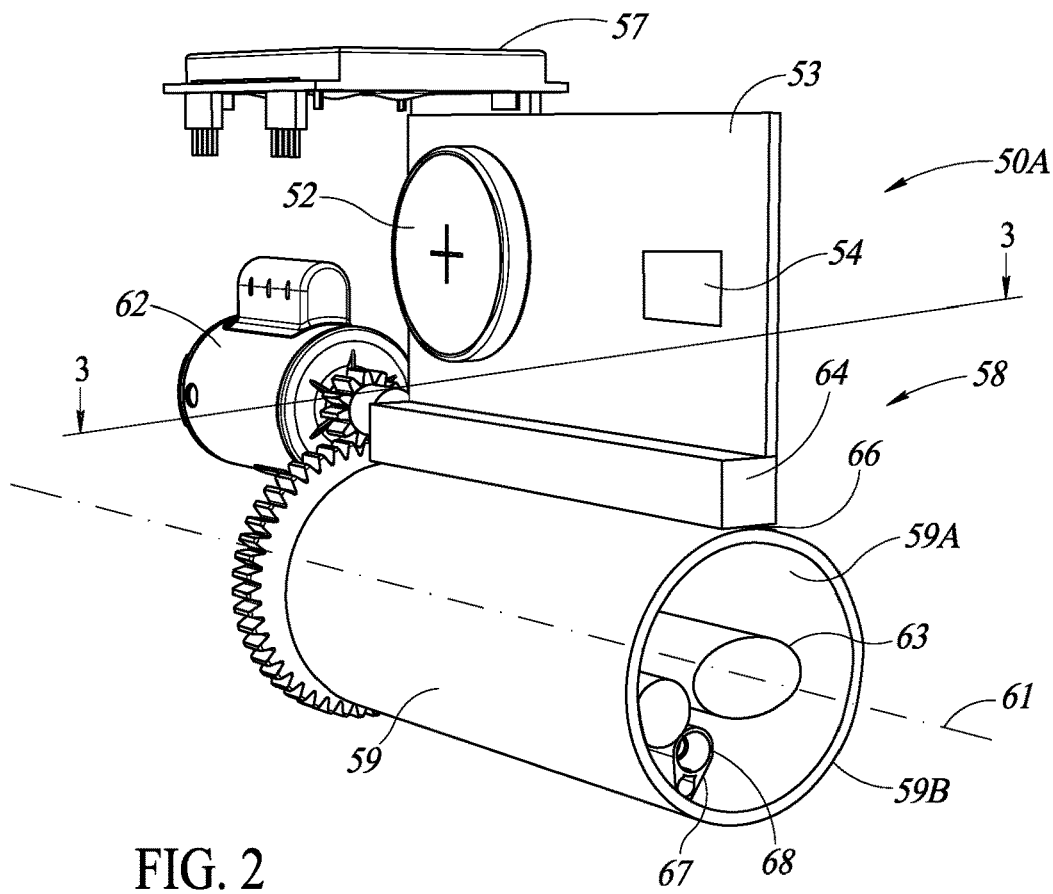
FIG. 2 is a schematic view of major components of the FIG. 1 assay apparatus including an interiorly disposed specimen collection tube and an interiorly disposed reagent dispenser.
Figure 3:
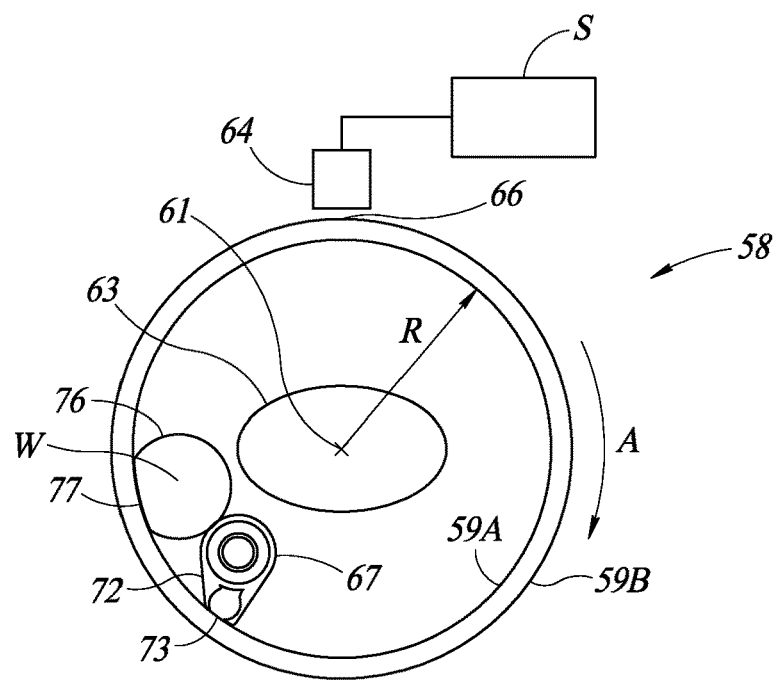
FIG. 3 is a transverse cross section of the FIG. 2 major components along line 3-3 therein.
Figure 4:
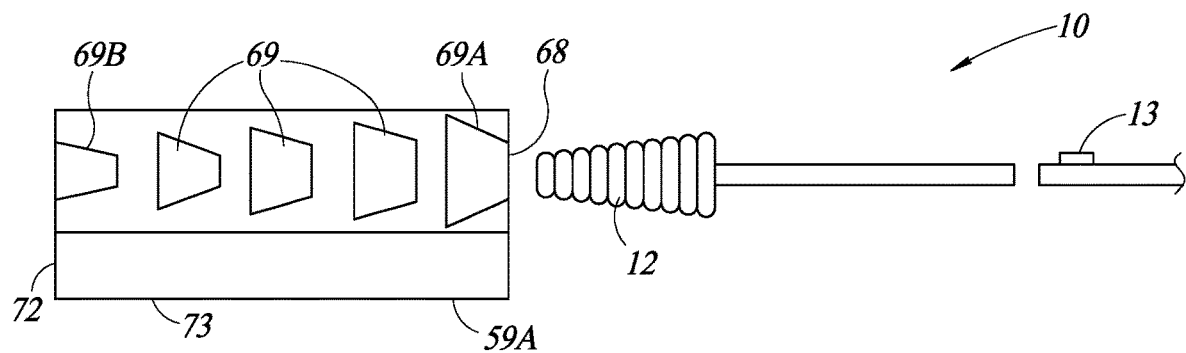
FIG. 4 is a longitudinal cross section of the specimen collection tube prior to snug sliding insertion of the specimen collection tip therein.
Figure 5:
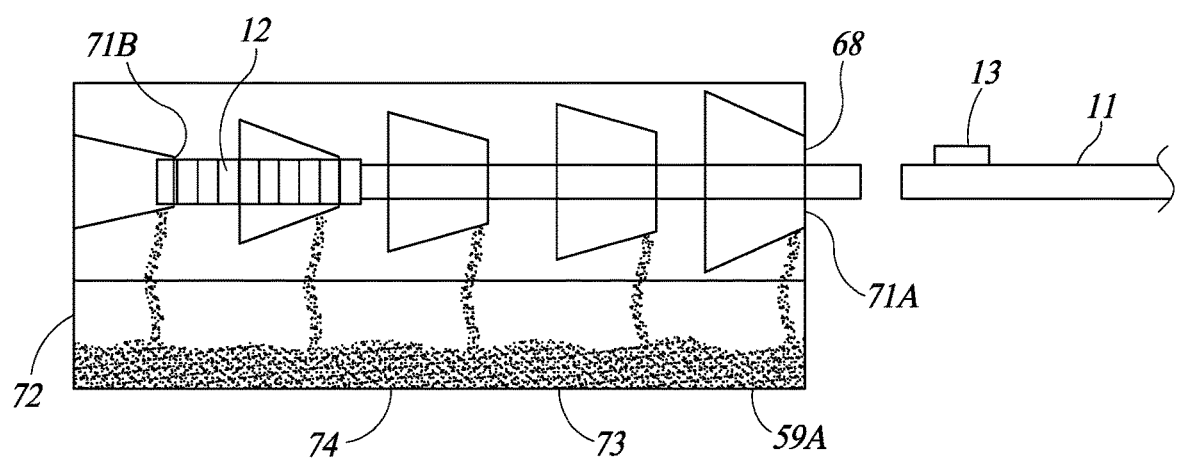
FIG. 5 is a longitudinal cross section of the specimen collection tube pursuant to snug sliding insertion of the specimen collection tip therein.

Rotary Drum Assay Apparatus and Stationary Line Scanner for Use with Conventional Handheld Specimen Collection Tools FIG. 1 shows a standalone rotary drum assay apparatus 50A for use with a conventional handheld specimen collection tool 10. The specimen collection tool 10 includes a handle 11 and an elongated specimen collection tip 12 for obtaining a bodily specimen. The elongated specimen collection tip 12 is preferably either generally cylindrical or conical and can be in the form of a swab, a brush, and the like. The elongated specimen collection tip 12 preferably tapers to a leading specimen collection tip end 12A from a trailing specimen collection tip end 12B. The elongated specimen collection tip 12 has a specimen collection tip length L1. The specimen collection tip length L1 is typically between about 1 cm to 3 cm depending on an intended clinical application but can be shorter or longer as required. The handheld specimen collection tool 10 can include a release arrangement 13 for releasing and detaching the handle 11 from the specimen collection tip 12 after snug sliding insertion of the specimen collection tip 12 into assay apparatus 50A.

FIG. 1 to FIG. 5 show the array apparatus 50A includes a housing 51 having a power supply 52, a component board 53 having a controller 54, an on-board image processing functionality 56, and a user interface 57. The user interface 57 can include push buttons, a proximity sensor, a display, a touch sensitive screen, and the like. The user interface 57 is employed for activating apparatus 50A and inputting user information, for example, name, sex, age, and the like, and user commands. The user interface 57 is also employed for providing user instructions, test results, and the like.

The housing 51 includes a rigidly mounted rotary drum 58 having a transparent, generally cylindrical, hollow drum body 59. The drum body 59 has a horizontal longitudinal drum body centerline 61, a drum body length L2 co-directional with the horizontal longitudinal drum body centerline 61 and a drum body radius R transverse to the horizontal longitudinal drum body centerline 61. The drum body 59 has an internal drum body surface 59A and an external drum body surface 59B and a drum body perimeter transverse to the horizontal longitudinal drum body centerline 61. The drum body length L2 is typically twice or three times the specimen collection tip length L1.

The housing 51 includes an electric motor 62 for rotating the drum body 59 in a predetermined direction of rotation indicated by arrow A and at a predetermined speed of rotation. The external drum body surface 59B has a tangential speed proportional the drum body 59's revolutions per minute (rpm) and its perimeter 2πR. The housing 51 includes a rigidly mounted backlight illuminator 63 disposed inside the drum body 59 and co-extensive therewith such that it uniformly backlights the drum body 59 along its entire length. The backlight illuminator 63 is preferably deployed along the horizontal longitudinal drum body centerline 61 for backlighting the drum body 59. The backlight illuminator 63 can have different shaped transverse cross sections, for example, a circular cross section, an elliptical cross section, and the like. The backlight illuminator 63 can backlight illuminate the drum body 59 in one or more EMR modalities including inter alia visible light, UV, IR, and the like.

The housing 51 includes a commercially available rigidly mounted stationary line scanner 64 above and in closed proximity to the rotary drum body 59. Suitable line scanners are presently commercially available, for example, from Basler A G, An der Strusbek 60-62, 22926 Ahrensburg, Germany www.baslerweb.com. The line scanner 64 is co-extensive with the drum body 59 along the horizontal longitudinal drum body centerline 61. The line scanner 64 takes discrete frames along a scan line 66 co-directional with the horizontal longitudinal drum body centerline 61. The line scanner 64 has a controllable frame per second (fps) acquisition rate and is capable of being synchronized with the external drum body surface 59B's tangential speed to acquire high resolution frames.

The housing 51 includes a rigidly mounted specimen collection tube 67 disposed inside the drum body 59 and co-directional with the horizontal longitudinal drum body centerline 61. The specimen collection tube 67 is mounted beneath the horizontal longitudinal drum body centerline 61. The housing 51 has a specimen collection tube port 68 for snug sliding insertion of an elongated specimen collection tip 12 into the specimen collection tube 67. The specimen collection tube 67 includes a staggered series of hollow truncated cone scrapers 69 for scraping bodily specimen from a specimen collection tip 12 on its snug sliding insertion thereinto. Bodily specimen is peripherally smeared onto the hollow truncated cone scrapers 69 facing the specimen collection tube port 68. The scrapers 69 have concentric apertures 71 of progressively smaller diameters with the leading scraper 69A adjacent the specimen collection tube port 68 having the largest aperture diameter 71A and the trailing scraper 69B remote from the specimen collection tube port 68 having the smallest aperture diameter 71B corresponding to the tapering of the specimen collection tip 12. The scrapers 69 are designed such that a mild to moderate force is required to snugly slidingly insert the specimen collection tip 12 into the specimen collection tube 67 for compacting the specimen collection tip 12 as it passes through the scrapers 69 to scrape most bodily specimen therefrom. Bodily specimen gravitates from the scrapers 69 to fill a specimen collection chamber 72 thereunder. The scrapers 69 can be lightly vibrated to facilitate gravitation of bodily specimen therefrom to the specimen collection chamber 72. The specimen collection chamber 72 has a lowermost slit 73 co-directional with the horizontal longitudinal drum body centerline 61 to deposit bodily specimen along a bodily specimen deposit line 74 on the internal drum body surface 59A.

The housing 51 includes a rigidly mounted single reagent dispenser 76 co-directional with the horizontal longitudinal drum body centerline 61 and similarly disposed relative to the drum body 59 as the specimen collection tube 67. The reagent dispenser 76 is disposed between the specimen collection tube 67 and the line scanner 64 in the direction of rotation A. The reagent dispenser 76 is intended for dispensing a single reagent W along a reagent dispense line 77 on the internal drum body surface 59A to react with or dilute bodily specimen deposited along the bodily specimen deposit line 74 on rotation of the drum body 59. The reagent dispenser 76 dispenses the single reagent W along the same drum body length L2 co-directional with the horizontal longitudinal drum body centerline 61.

The operation of rotary drum assay apparatus 50A is as follows:

Assay apparatus 50A is switched on and a user is prompted to enter user details. A specimen collection tool 10 is employed to obtain a bodily specimen. Assay apparatus 50A instructs the user to slidingly insert the specimen collection tool's specimen collection tip 12 into the specimen collection tube 67. Moderate force is applied to push the specimen collection tip 12 through the scrapers 69 to scrape most bodily specimen therefrom. The user can then use the release arrangement 13 to release and disconnect the handle 11 from the specimen collection tip 12 which remains inside the assay apparatus 50A. Assay apparatus 50A waits a predetermined time for bodily specimen to gravitate from the scrapers 69 into the underlying specimen collection chamber 72. Bodily specimen gravitates through the lowermost slit 73 to form a bodily specimen deposit along the bodily specimen deposit line 74 on the internal drum body surface 59A.

Assay apparatus 50A starts to rotate the drum body 59 in the predetermined direction of rotation A at a predetermined speed of rotation to start forming a longitudinal bodily specimen deposit extending along the internal drum body surface 59A and covering a continuously increasing arc of the internal drum body surface 59A in an end elevation view of the drum body 59 along the horizontal longitudinal drum body centerline 61. The specimen collection tip 12 remains stationary within the specimen collection tube 67 during such rotation. Continuing rotation of the drum body 59 causes the initially deposited bodily specimen to react with the reagent W along the reagent dispense line 77 to start forming a longitudinal reacted bodily specimen deposit extending along the internal drum body surface 59A. Further continuing rotation of the drum body 59 causes the reacted bodily specimen deposit to cover a continuously increasing arc of the internal drum body surface 59A in an end elevation view of the drum body 59 along the horizontal longitudinal drum body centerline 61.

Further continuing rotation of the drum body 59 causes the leading edge of the reacted bodily specimen deposit to be rotated under the line scanner 64 for scanning at the scan line 66 for the start of an acquisition of a reacted bodily specimen scan S. Continuing rotation of the drum body 59 through an entire single rotation causes the entire internal drum body surface 59A to be initially covered by a reacted bodily specimen deposit which is scanned to form a reacted bodily specimen scan S1. The reacted bodily specimen scan S1 includes a consecutive series of frames F each having a frame length L2 equal to the drum body length L2. For illustrative purposes only, the reacted bodily specimen scan S includes 16 frames F for a complete scan of the internal drum body surface 59A.

Depending on line scanner 64's fps and the internal drum body surface 59A's tangential speed, adjacent frames may include overlapping sections of the reagent W reacted body specimen deposit. Image processing software can immediately analyze the reacted bodily specimen scan to determine whether sufficient information for diagnosis purposes has been acquired from a partial rotation of the drum body 59. For example, scanning a hemi-cylinder of the internal drum body surface 59A may be sufficient for diagnosis purposes in which case operation of the rotary drum 58 and the line scanner 64 can be terminated.

Figure 6:
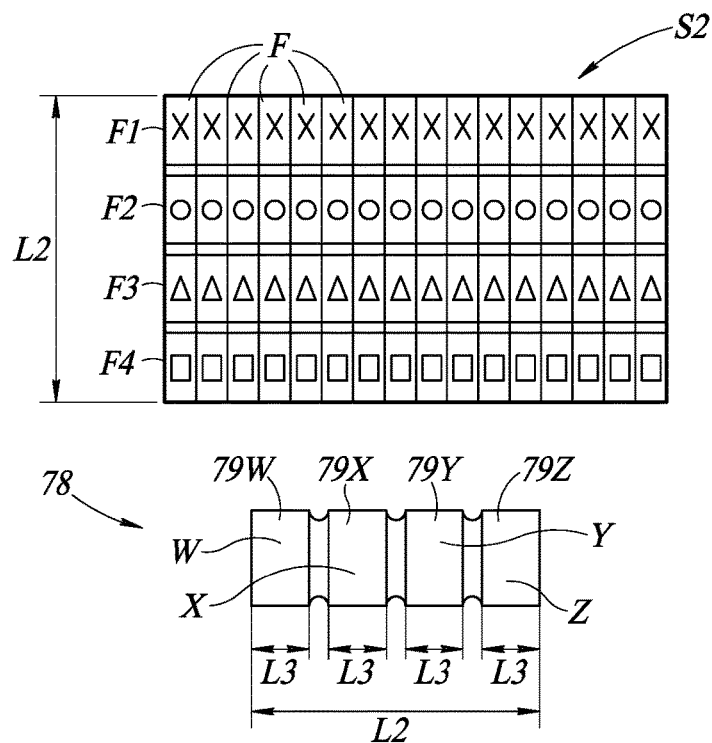
FIG. 6 is a schematic view of a multiple reagent dispenser for simultaneously dispensing four reagents on a drum body surface and frames acquired by scanning same.

FIG. 6 shows a multiple reagent dispenser 78 instead of the single reagent dispenser 76. The multiple reagent dispenser 78 has four reagent dispensers 79W, 79X, 79Y and 79Z for simultaneously dispensing four different reagents: W, X, Y and Z, respectively, along the reagent dispense line 77. Adjacent reagent dispensers 79 are preferably spaced apart by a few millimeter separation such that reacted bodily specimen deposits are correspondingly spaced apart to avoid undesirable overlapping therebetween and to preclude mixing. Accordingly, assuming each reagent dispenser 79 dispenses along an equal length L3, then L2>4L3 due to the separations.

FIG. 6 also shows a reacted bodily specimen scan S2 arising from scanning the complete internal drum body surface 59A on deployment of the multiple reagent dispenser 78 instead of the single reagent dispenser 76. Each frame F is co-extensive with the drum body 59 and therefore has a frame length L2 equal to the drum body length L2. The reacted bodily specimen scan S2 has the same number of frames as the reacted bodily specimen scan S1 but its frames are different insofar as the reacted bodily specimen scan S2's frames each include four frame sections F1, F2, F3 and F4 corresponding to the four reacted bodily specimen deposits being traced out over a continuously increasing arc of the internal drum body surface 59A from an end elevation view of the drum body 59 along the horizontal longitudinal drum body centerline 61. For illustrative purposes, the four frame sections are shown with different shading as follows: frame sections F1 of the reagent W reacted bodily specimen deposit are depicted by crosses, frame sections F2 of the reagent X reacted bodily specimen deposit are depicted by circles, frame sections F3 of the reagent Y reacted bodily specimen deposit are depicted by triangles, and frame sections F4 of the reagent Z reacted bodily specimen deposit are depicted by squares.

Figure 7:
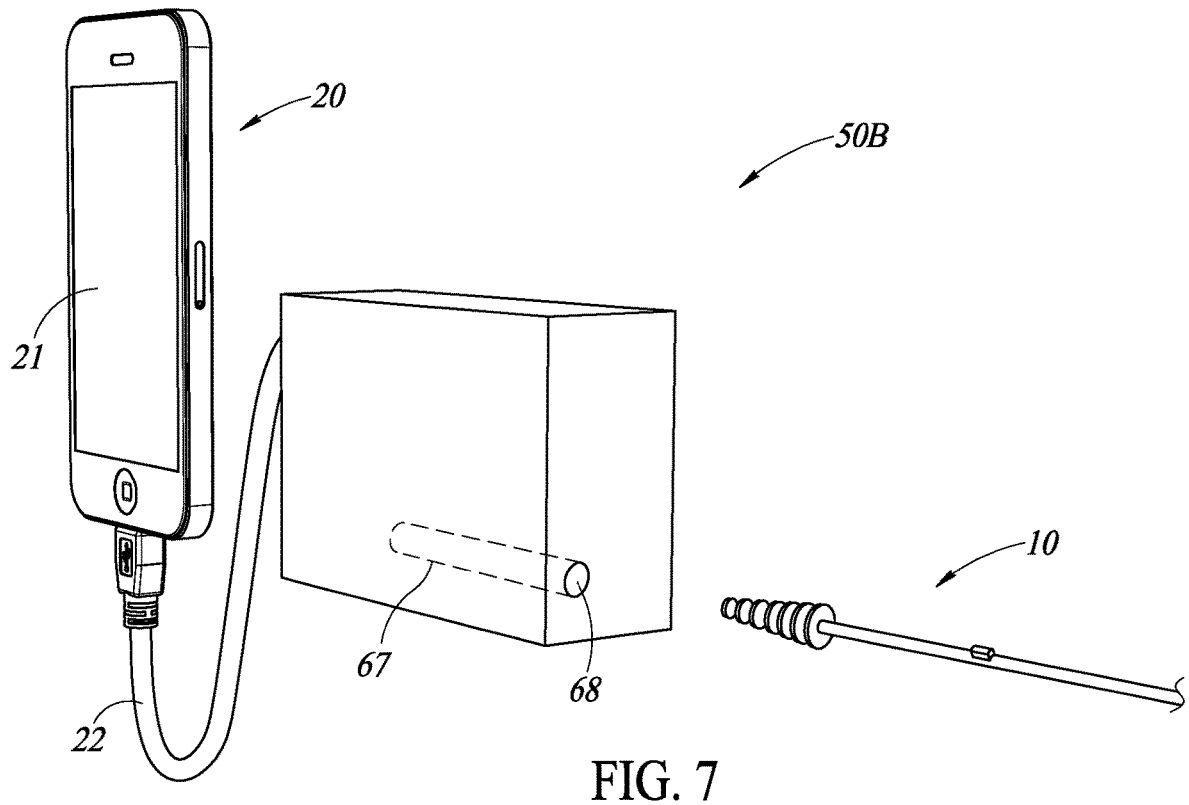
FIG. 7 is a schematic view of a rotary drum assay apparatus in wired connection with an external computing device.

FIG. 7 shows rotary drum assay apparatus 50B for use with an external computing device 20 having a user interface operating system 21 for replacing the user interface 57. For illustrative purposes only, the external computing device 20 is exemplified as a smartphone. The external computing device 20 can equally be implemented as tablet, a laptop computer, and the like. The user interface operation system 21 can be a web site, application or other dedicated software that enables operation of assay apparatus 50B. The user interface operation system 21 can communicate with assay apparatus 50B through a communication wire 22 or wirelessly (WiFi, Bluetooth, and alike). Assay apparatus 50B can have on-board image processing functionality or alternatively can employ cloud-based image processing functionality. Assay apparatus 50B can alternatively be powered by the external computing device 20 therefore precluding need for an internal power supply. The operation of assay apparatus 50B is similar to the operation of assay apparatus 50A.

Figure 8:
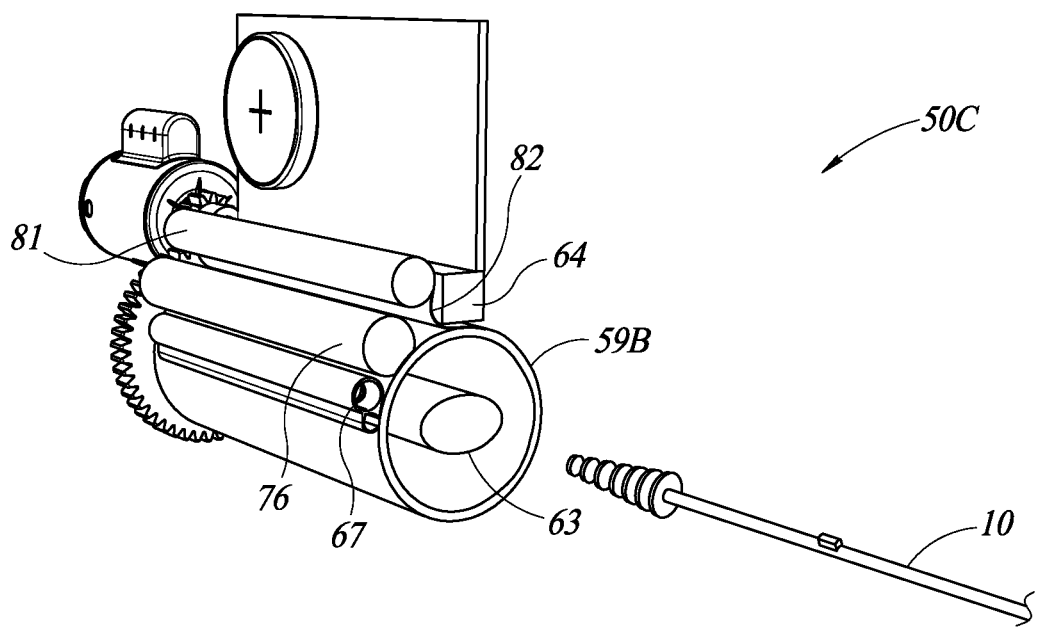
FIG. 8 is a perspective view of major components on another embodiment of a standalone rotary drum assay apparatus.

FIG. 8 shows rotary drum assay apparatus 50C similar in construction to rotary drum assay apparatus 50A and therefore similar parts are likewise numbered. Assay apparatus 50C differs from assay apparatus 50A in two respects as follows: First, the specimen collection tube 67 is exteriorly disposed to the drum body 59 whereby bodily specimen is deposited on the external drum body surface 59B instead of the internal drum body surface 59A. Similarly, the reagent dispenser 76 is also disposed outside the drum body 59. Assay apparatus 50C further includes a stationary rigidly mounted cling film dispenser 81 for dispensing cling film 82 on the external drum body surface 59B during its rotation for protecting the line scanner 64 from being daubed by reacted bodily specimen which would preclude acquiring high quality reacted bodily specimen scans. The operation of assay apparatus 50C is similar to the operation of assay apparatus 50A.

Purpose-Built Handheld Specimen Collection Tools

Figure 9A:
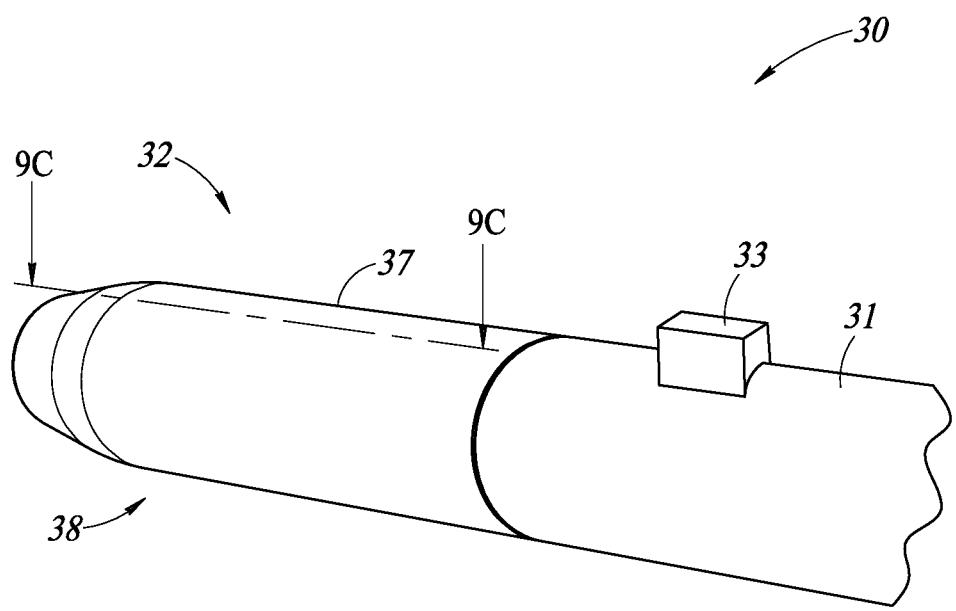
FIG. 9A is a perspective view of a purpose-built handheld specimen collection tool.

FIG. 9A to FIG. 9C show a purpose-built handheld specimen collection tool 30 for use with two different types of assay apparatus as described hereinbelow: rotary drum assay apparatus and stationary drum assay apparatus. The specimen collection tool 30 includes a handle 31 and an elongated hollow specimen collection tip 32 for obtaining bodily specimen. The specimen collection tool 30 can include a release arrangement 33 for releasing and detaching the handle 31 from the specimen collection tip 32. The specimen collection tip 32 has a longitudinal specimen collection tip centerline 34 and an internal peripheral specimen collection tip surface 36 and an external peripheral specimen collection tip surface 37 for bearing bodily specimen. The specimen collection tip 32 has a specimen collection tip length L4.

Bodily specimen is preferably reacted with at least one reagent for initial scanning before subsequent image processing. Consequently specimen collection tools are precluded from having an exposed reagent surface because an act of obtaining bodily specimen from a patient would lead to reagent reaction at the location of obtaining his or her bodily specimen. In view of this restriction, the present invention envisages two approaches for designing a specimen collection tool 30 as follows:

a. Basic purpose-built handheld specimen collection tools for obtaining a bodily specimen only. Such basic specimen collection tools are intended for use with assay apparatus having an internal drum body surface with a reagent lining for reacting with bodily specimen on sliding insertion of a purpose-built handheld specimen collection tool into a drum body. FIG. 10 shows a basic purpose-built handheld specimen collection tool 30A having the same construction as the specimen collection tool 30. The specimen collection tool 30A has a handle 31, a specimen collection tip 32A and a release arrangement 33.

b. Purpose-built handheld specimen collection tools having an integral reagent dispenser containing at least one reagent for reacting with bodily specimen for use with assay apparatus having an internal drum body surface without a reagent lining. Such specimen collection tools each include an integral reagent dispenser 38 which is positively actuated on sliding insertion of a specimen collection tip into a drum body. An integral reagent dispenser 38 may dispense a single reagent or multiple reagents. An integral reagent dispenser 38 underlies an external peripheral specimen collection tip surface 37. An integral reagent dispenser 38 may overlie an internal peripheral specimen collection tip surface 36 or alternatively form part of an internal peripheral specimen collection tip surface 36. Actuation of an integral reagent dispenser 38 leads to reagent being dispensed for reaction with bodily specimen on an external peripheral specimen collection tip surface 37. Dispensing can be, for example, in the form of forced flow through capillary tubes, intended leakage from intended partial destruction of a sealed container, and the like.

FIG. 11A and FIG. 11B show a specimen collection tool 30B having the same construction as the specimen collection tool 30 and including an elongated hollow specimen collection tip 32B with an integral reagent dispenser 38B for dispensing a single reagent W for reacting with bodily specimen. The integral reagent dispenser 38B has a cylindrical construction between the internal peripheral specimen collection tip surface 36 and the external peripheral specimen collection tip surface 37 for uniformly dispensing reagent W. The integral reagent dispenser 38B has a series of radially directed capillary tubes 39 extending therealong. The radially directed capillary tubes 39 extend to the external peripheral specimen collection tip surface 37.

FIG. 12A and FIG. 12B show a specimen collection tool 30C having the same construction as the specimen collection tool 30 and including an elongated hollow specimen collection tip 32C with an integral multiple reagent dispenser 38C for dispensing four reagents W, X, Y and Z. The integral multiple reagent dispenser 38C includes four near quarter cylindrical reagent dispensers 38W, 38X, 38Y and 38Z between the internal peripheral specimen collection tip surface 36 and the external peripheral specimen collection tip surface 37 for correspondingly containing the four reagents W, X, Y and Z. The four near quarter cylindrical reagent dispensers 38W, 38X, 38Y and 38Z are peripherally spaced apart in the FIG. 12B cross section. The integral multiple reagent dispenser 38C has a series of radially directed capillary tubes 39 extending therealong. The radially directed capillary tubes 39 extend to the external peripheral specimen collection tip surface 37. The external peripheral specimen collection tip surface 37 includes four equi-spaced longitudinal grooves 41 in registration with the separations between the four quarter cylindrical reagent dispensers 38W, 38X, 38Y and 38Z to avoid undesirable mixing or overlapping between reacted bodily specimen deposits formed on the external peripheral specimen collection tip surface 37.

FIG. 13 shows a specimen collection tool 30D having the same construction as the specimen collection tool 30 and including an elongated specimen collection tip 32D with an integral multiple reagent dispenser 38D for dispensing four reagents W, X, Y and Z. The integral multiple reagent dispenser 38D includes four torus shaped reagent dispensers 38W, 38X, 38Y and 38Z between the internal peripheral specimen collection tip surface 36 and the external peripheral specimen collection tip surface 37 for correspondingly containing the four reagents W, X, Y and Z. The external peripheral specimen collection tip surface 37 includes four peripheral grooves 42 in registration with the separations between the four torus shaped reagent dispensers 38W, 38X, 38Y and 38Z to avoid undesirable mixing or overlapping between reacted bodily specimen deposits formed on external peripheral specimen collection tip surface 37.

Figure 14:
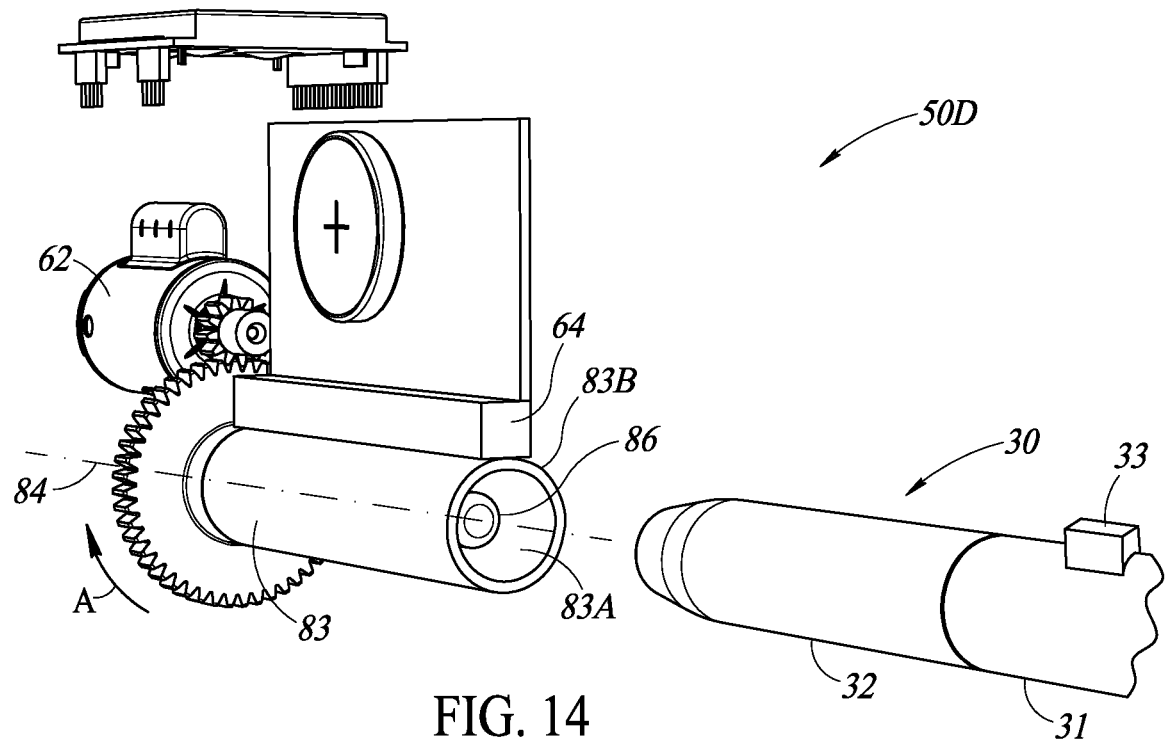
FIG. 14 is a schematic view of a standalone rotary drum assay apparatus for use with a purpose-built handheld specimen collection tool.

Rotary Drum Assay Apparatus and Stationary Line Scanner for Use with Purpose-Built Handheld Specimen Collection Tools FIG. 14 shows rotary drum assay apparatus 50D for use with a specimen collection tool 30 representative of the specimen collection tools 30A-30D. The specimen collection tool 30 has a handle 31 and a specimen collection tip 32 representative of the specimen collection tips 32A-32D.

The rotary drum assay apparatus 50D includes an electric motor 62 for rotating a transparent, generally cylindrical, hollow drum body 83 about a horizontal longitudinal drum body centerline 84 in a predetermined direction of rotation indicated by arrow A and at a predetermined speed of rotation. The drum body 83 has at least the same length L4 as a specimen collection tip 32. The drum body 83 includes an internal drum body surface 83A and an external drum body surface 83B. The rotary drum assay apparatus 50D includes a rigidly mounted backlight illuminator 86 co-extensive with the drum body 83 and deployed along the horizontal longitudinal drum body centerline 84 for uniformly backlighting the drum body 83. The backlight illuminator 86 preferably rotates together with the drum body with respect to the stationary line scanner 64. Alternatively, the rotary drum assay apparatus 50D can be designed with a stationary backlight illuminator 86.

The specimen collection tip 32, the drum body 83 and the backlight illuminator 86 are matching sized and shaped such that, on snugly sliding insertion of the specimen collection tip 32 into the drum body 83, the backlight illuminator 86 is simultaneously snugly slidingly inserted into the specimen collection tip 32. Accordingly, the drum body 83 doubles as a specimen collection tube insofar as a specimen collection tip 32's external peripheral specimen collection tip surface 37 is in intimate contact with the internal drum body surface 83A while at the same time the specimen collection tip 32's internal specimen collection tip surface 36 is in intimate contact with the backlight illuminator 86. The internal peripheral specimen collection tip surface 36 and the backlight illuminator 86 have the same circular transverse cross section, elliptical transverse cross section, and the like. The external peripheral specimen collection tip surface 37 and the internal drum body surface 83A have the same circular transverse cross section, elliptical transverse cross section, and the like.

FIG. 15 to FIG. 19 show five combinations of rotary drum assay apparatus 50D and a specimen collection tool 30. For sake of simplicity, on using a specimen collection tool 30 to obtain a bodily specimen, its specimen collection tip 32 is assumed to be uniformly peripherally covered by bodily specimen. After snug sliding insertion of a specimen collection tip 32 bearing bodily specimen into rotary drum assay apparatus 50D, rotary drum assay apparatus 50D is immediately ready to start scanning the internal drum body surface 83A to acquire a reacted bodily specimen scan S. Acquired reacted bodily specimen scans are a function of different embodiments of rotary drum assay apparatus 50D and different embodiments of a specimen collection tool 30 as described hereinbelow.

Figure 15:
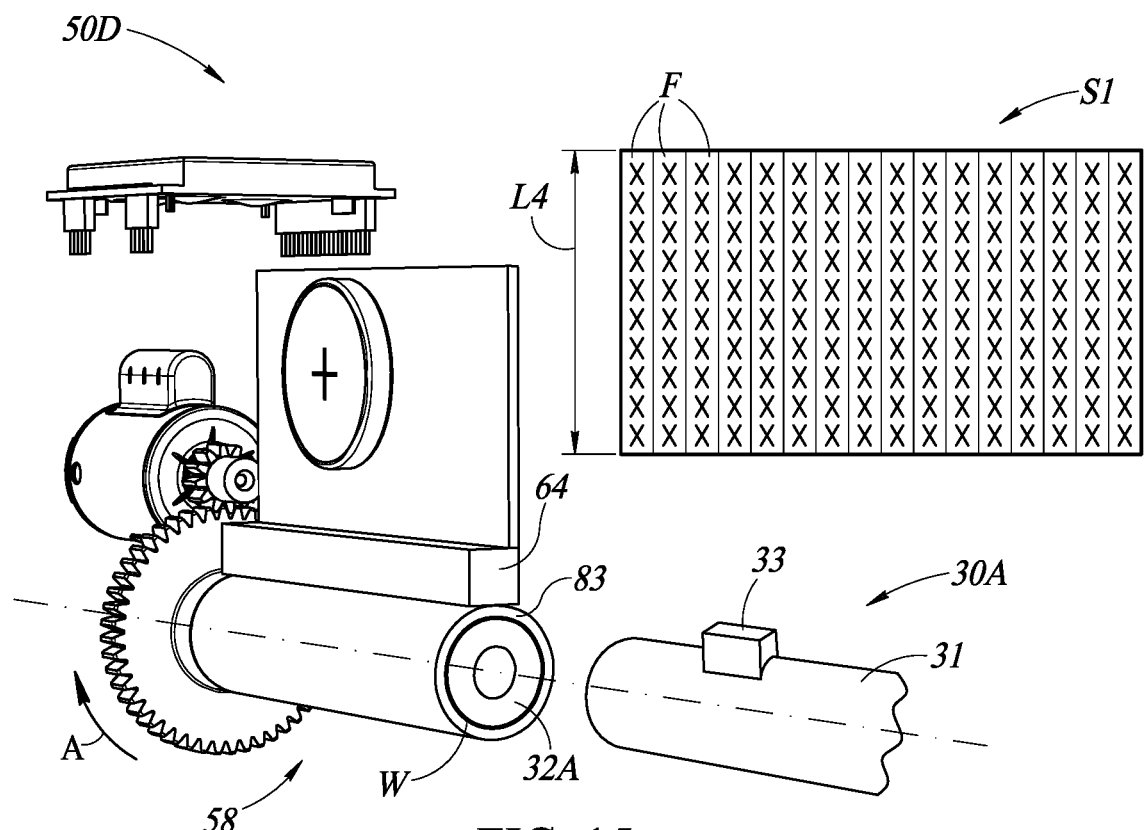
FIG. 15 is a pictorial representation of the FIG. 14 rotary drum assay apparatus with a single reagent lining, a FIG. 10 specimen collection tool and a resulting reacted bodily specimen scan.

FIG. 15 shows rotary drum assay apparatus 50D with its internal drum body surface 83A having a single reagent W lining longitudinally co-extensive therewith and after insertion of a specimen collection tool 30A's specimen collection tip 32A into the drum body 83 and detachment of the handle 31. On snug sliding insertion of the specimen collection tip 32A into the drum body 83, the single reagent W immediately reacts with the specimen collection tip 32A's bodily specimen to form a reagent W reacted bodily specimen deposit on the internal drum body surface 83A. FIG. 15 shows scanning the internal drum body surface 83A acquires a reacted bodily specimen scan S1 similar to FIG. 1's bodily reacted specimen scan S1. Image processing software can immediately analyze the reacted bodily specimen scan to determine whether sufficient information for diagnosis purposes has been acquired from a partial rotation of the drum body 83. For example, scanning a hemi-cylinder of the internal drum body surface 83A may be sufficient for diagnosis purposes in which case operation of the rotary drum 58 and the line scanner 64 can be terminated.

Figure 16:
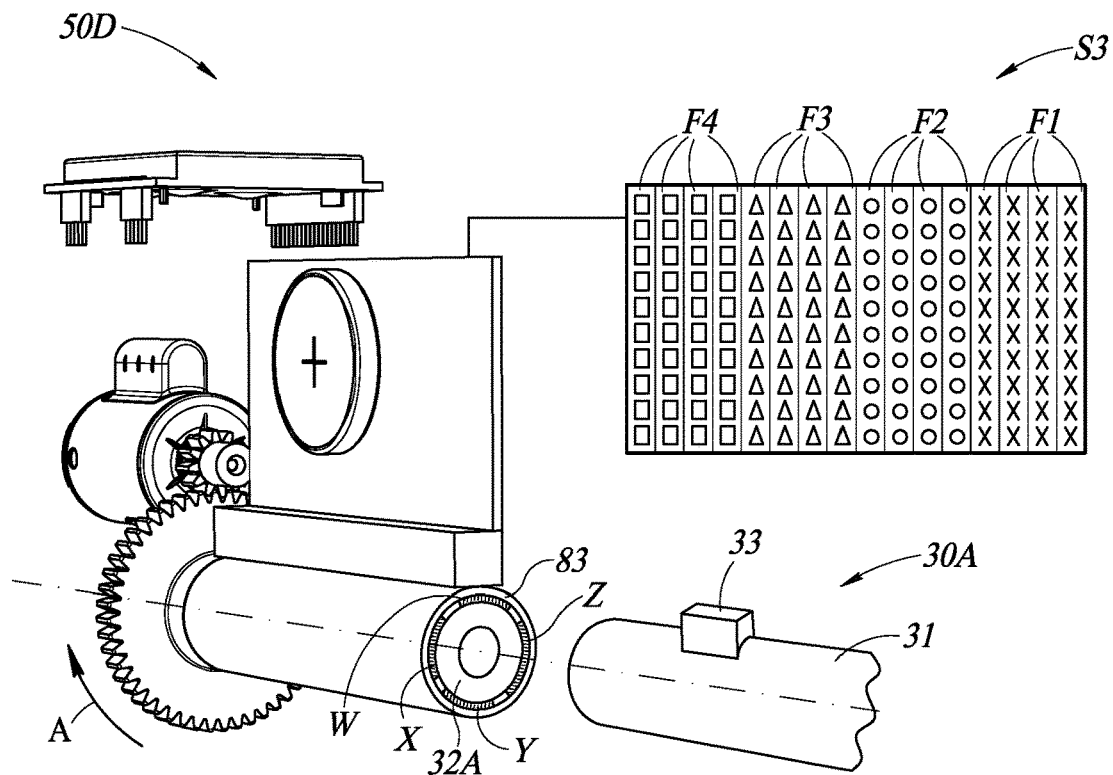
FIG. 16 is a pictorial representation of the FIG. 14 rotary drum assay apparatus with a multiple reagent lining, a FIG. 10 specimen collection tool and a resulting reacted bodily specimen scan.

FIG. 16 shows a rotary drum assay apparatus 50D with its internal drum body surface 83A having four reagent W, Z, Y and Z lining longitudinally co-extensive therewith and after insertion of a specimen collection tool 30A's specimen collection tip 32A into the drum body 83 and detachment of the handle 31. Each reagent W, X, Y and Z covers a near quarter cylindrical section of the internal drum body surface 83A appearing as a near quarter arc in an end elevation view of the drum body 83 along the horizontal longitudinal drum body centerline 84. On snug sliding insertion of the specimen collection tip 32B into the drum body 83, the four reagents W, X, Y and Z immediately react with the specimen collection tip 32B's bodily specimen to form a reagent W reacted bodily specimen deposit, a reagent X reacted bodily specimen deposit, a reagent Y reacted bodily specimen deposit and a reagent Z reacted bodily specimen deposit on the internal drum body surface 83A. Each adjacent reagent pair W-X, X-Y, Y-Z, and Z-W is spaced apart by a longitudinal separation such that on snug sliding insertion of a specimen collection tip 32A thereinto, the specimen collection tip 32A's bodily specimen reacts with the four reagents W, X, Y and Z on the internal drum body surface 83A to form spaced apart longitudinal reacted bodily specimen deposits to avoid undesirable overlapping therebetween.

FIG. 16 shows scanning the internal drum body surface 83A acquires a reacted bodily specimen scan S3 in which frames are sequenced as follows: first frames F1 of the reagent W reacted bodily specimen deposit are depicted by crosses, second frames F2 of the reagent X reacted bodily specimen deposit are depicted by circles, third frames F3 of the reagent Y reacted bodily specimen deposit are depicted by triangles, and lastly frames F4 of the reagent Z reacted bodily specimen deposit are depicted by squares. Accordingly, the entire internal drum body surface 83A has to be scanned to acquire a reacted complete bodily specimen scan S3 in terms of bodily specimen having been reacted with the four reagents W, X, Y and Z.

Figure 17:
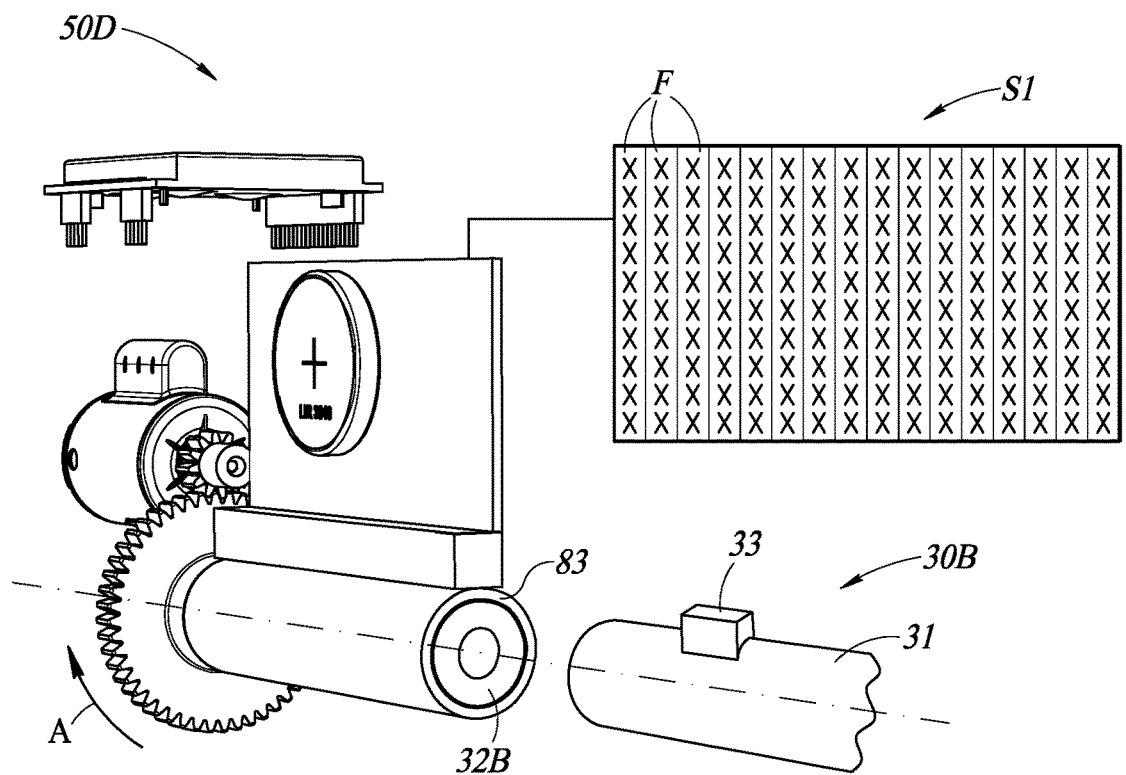
FIG. 17 is a pictorial representation of the FIG. 14 rotary drum assay apparatus, a FIG. 11 handheld specimen collection tool and a resulting reacted bodily specimen scan.

FIG. 17 shows a rotary drum assay apparatus 50D after insertion of a specimen collection tool 30B's specimen collection tip 32B into the drum body 83 and detachment of the handle 31. On snug sliding insertion of the specimen collection tip 32B into the drum body 83, the backlight illuminator 86 actuates the integral reagent dispenser 38B to dispense the reagent W which reacts with bodily specimen on the external specimen collection tip surface 37. FIG. 17 shows scanning the internal drum body surface 83A acquires a reacted bodily specimen scan S1 similar to FIG. 1's reacted bodily specimen scan S1. Image processing software can immediately analyze the reacted bodily specimen scan to determine whether sufficient information for diagnosis purposes has been acquired from a partial rotation of the drum body 83. For example, scanning a hemi-cylinder of the internal drum body surface 83A may be sufficient for diagnosis purposes in which case operation of the rotary drum 58 and the line scanner 64 can be terminated.

Figure 18:
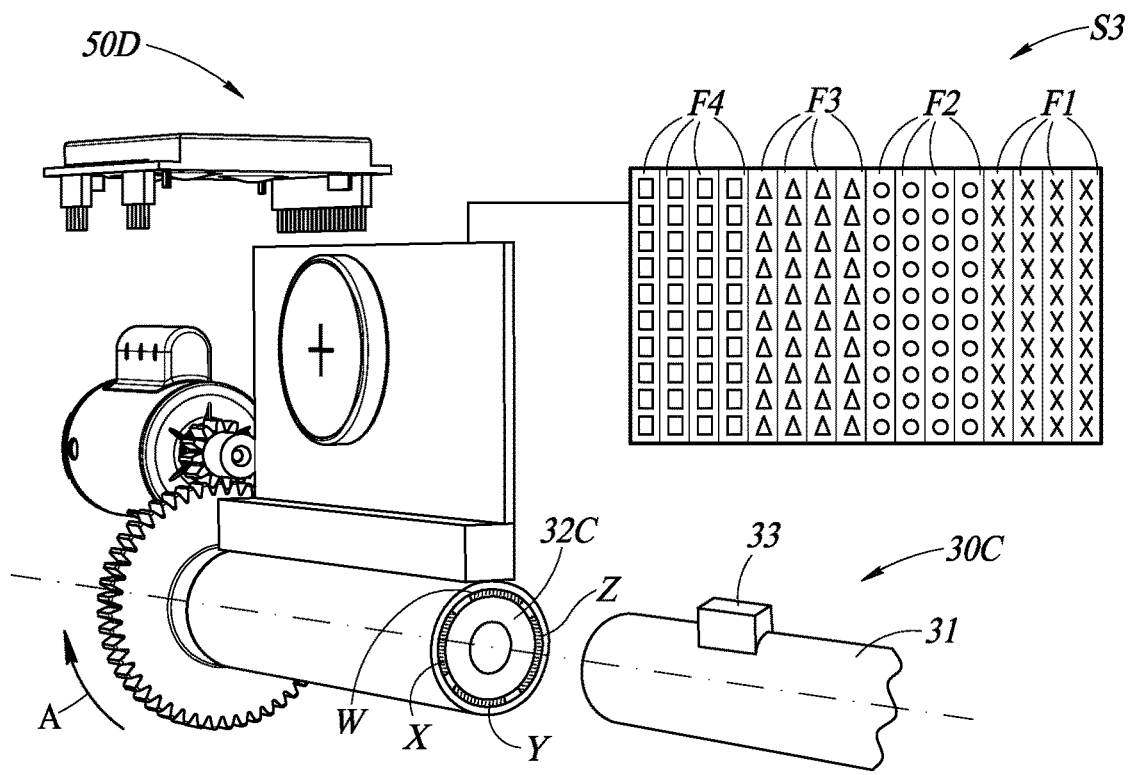
FIG. 18 is a pictorial representation of the FIG. 14 rotary drum assay apparatus, a FIG. 12 specimen collection tool and a resulting reacted bodily specimen scan.

FIG. 18 shows rotary drum assay apparatus 50D after insertion of a specimen collection tool 30C's specimen collection tip 32C into the drum body 83 and detachment of the handle 31. On snug sliding insertion of its specimen collection tip 32C into the drum body 83, the backlight illuminator 86 actuates the integral reagent dispenser 38C to dispense the four reagents W, X, Y and Z which react with bodily specimen on the external specimen collection tip surface 37. On the same snug sliding insertion, the external specimen collection tip surface 37 deposits a reagent W reacted bodily specimen deposit, a reagent X reacted bodily specimen deposit, a reagent Y reacted bodily specimen deposit and a reagent Z reacted bodily specimen deposit on the internal drum body surface 83A.

FIG. 18 shows scanning the internal drum body surface 83A acquires a reacted bodily specimen scan S3 similar to FIG. 16's reacted bodily specimen scan S3. Accordingly, frames are sequenced as follows: first frames F1 of the reagent W reacted bodily specimen deposit are depicted by crosses, second frames F2 of the reagent X reacted bodily specimen deposit are depicted by circles, third frames F3 of the reagent Y reacted bodily specimen deposit are depicted by triangles, and lastly frames F4 of the reagent Z reacted bodily specimen deposit are depicted by squares. The entire internal drum body surface 83A has to be scanned to acquire a complete reacted bodily specimen scan S in terms of bodily specimen having been reacted with the four reagents W, X, Y and Z.

Figure 19:
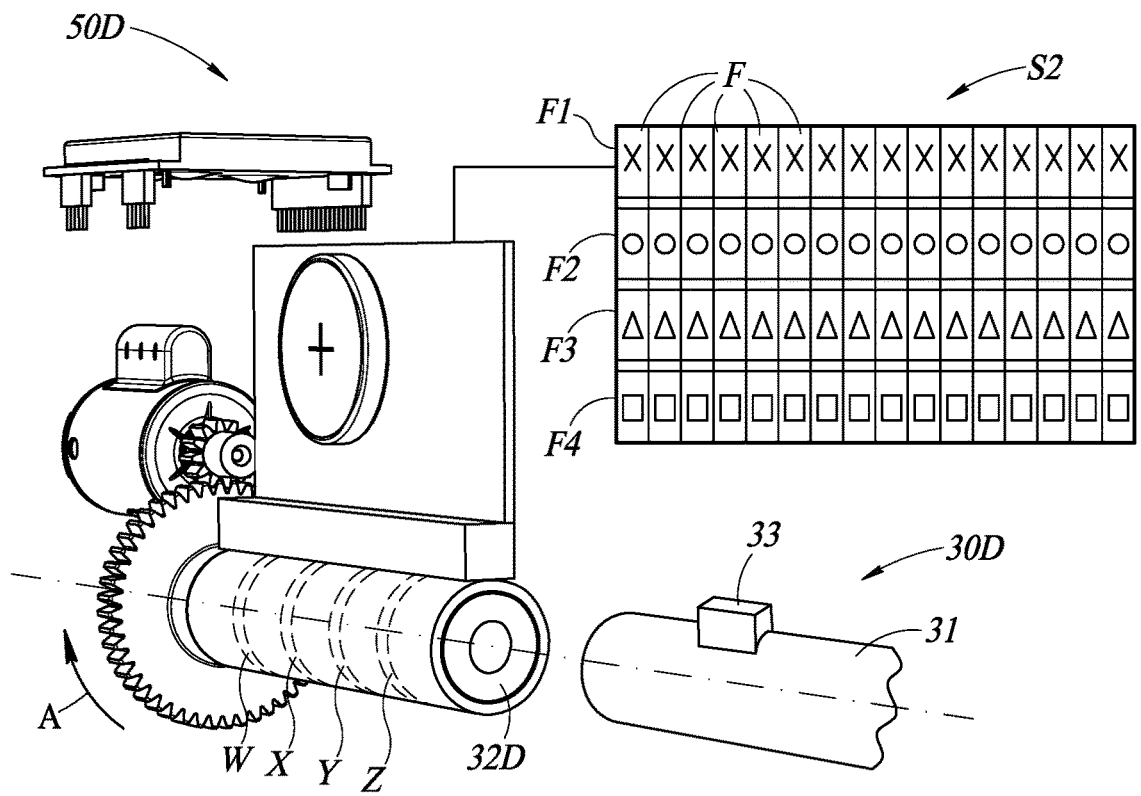
FIG. 19 is a pictorial representation of the FIG. 14 rotary drum assay apparatus, a FIG. 13 specimen collection tool and a resulting reacted bodily specimen scan.

FIG. 19 shows rotary drum assay apparatus 50D after insertion of a specimen collection tool 30D's specimen collection tip 32D into the drum body 83 and detachment of the handle 31. On snug sliding insertion of its specimen collection tip 32D into the drum body 83, the backlight illuminator 86 actuates the integral reagent dispenser 38D to dispense the four reagents W, X, Y and Z which react with bodily specimen on the external specimen collection tip surface 37. On the same sung sliding insertion, the external specimen collection tip surface 37 deposits a reagent W reacted bodily specimen deposit, a reagent X reacted bodily specimen deposit, a reagent Y reacted bodily specimen deposit and a reagent Z reacted bodily specimen deposit on the internal drum body surface 83A.

FIG. 19 shows scanning the internal drum body surface 83A acquires a reacted bodily specimen scan S similar to FIG. 6's reacted bodily specimen scan S2. Each frame F includes four sections F1, F2, F3 and F4 corresponding to the four reacted bodily specimen deposits. For illustrative purposes, the four sections are shown with different shading as follows: frame sections F1 of the reagent W reacted bodily specimen deposit are depicted crosses, frame sections F2 of the reagent X reacted bodily specimen deposit are depicted by circles, frame sections F3 of the reagent Y reacted bodily specimen deposit are depicted by triangles, and frame sections F4 of the reagent Z reacted bodily specimen deposit are depicted by squares.

Figure 20:
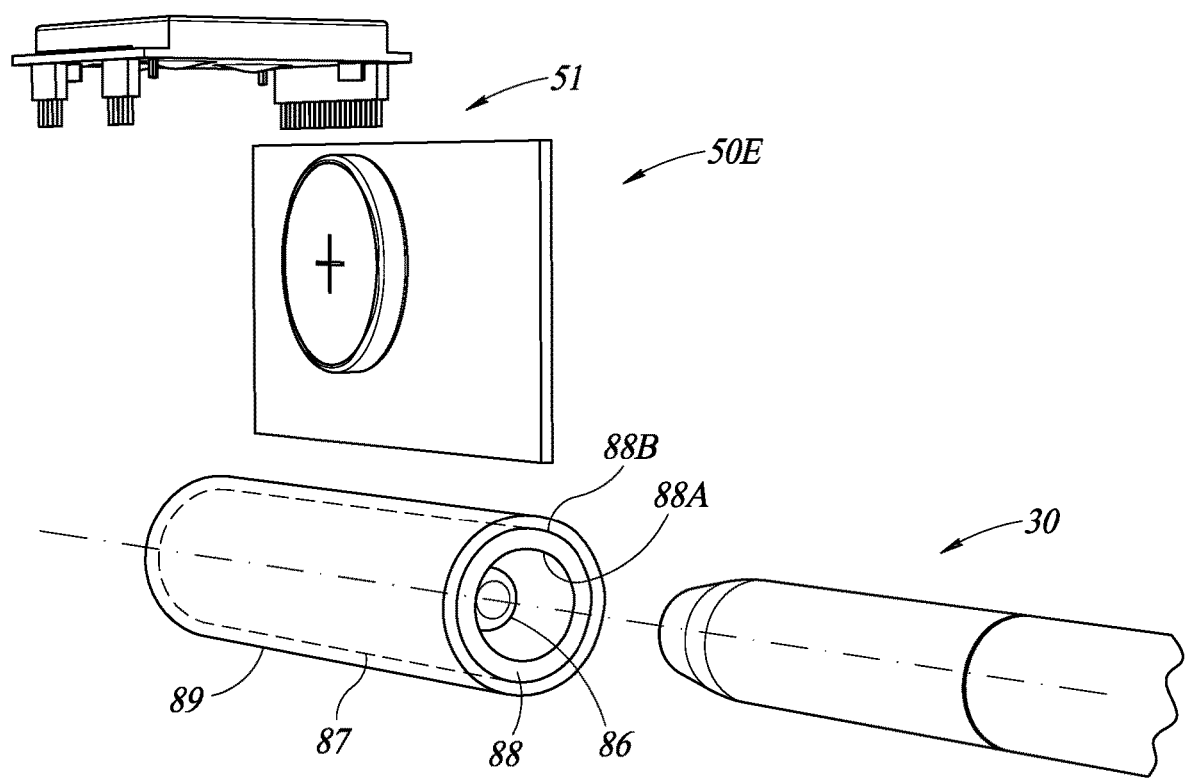
FIG. 20 is a pictorial representation of a standalone stationary drum assay apparatus with a stationary cylindrical scanner for use with a purpose-built handheld specimen collection tool.

Stationary Drum Assay Apparatus and Stationary Cylindrical Scanner for Use with Purpose-Built Specimen Collection Tools FIG. 20 shows stationary drum assay apparatus 50E for use with a specimen collection tool 30 to acquire a reacted bodily specimen scan. Stationary drum assay apparatus 50E includes a housing 51 having a stationary drum 87 with a horizontal, transparent, generally cylindrical, hollow drum body 88 and a cylindrical scanner 89 peripherally surrounding the drum body 88. The drum body 88 has an internal drum body surface 88A made of light sensitive cells formed into a cylindrical shape backlighted by the backlight illuminator 86. The light sensitive cells can be implemented as a CCD array sheet, a CMOS array sheet, and the like. After snug sliding insertion of a specimen collection tip 32 bearing bodily specimen into stationary drum assay apparatus 50E, stationary drum assay apparatus 50E is immediately ready to start scanning the internal drum body surface 88A to acquire a reacted bodily specimen scan S. Acquired reacted bodily specimen scans are a function of different embodiments of stationary drum assay apparatus 50E and different embodiments of a specimen collection tool 30 in a similar manner as described hereinabove with reference to different embodiments of rotary drum assay apparatus 50D and different embodiments of a specimen collection tool 30. Stationary drum assay apparatus 50E can be modified for use with an external computing device 20 having a user interface operating system 21 in a similar manner as rotary drum assay apparatus 50B.

While the invention has been described with respect to a limited number of embodiments, it will be appreciated that many variations, modifications, and other applications of the invention can be made within the scope of the appended claims.

The invention claimed is:

1. An assay apparatus for use with a handheld specimen collection tool having an elongated specimen collection tip for bearing bodily specimen therealong, the assay apparatus comprising:
   a) a drum having a transparent, generally cylindrical, hollow drum body with a horizontal longitudinal drum body centerline, an internal drum body surface and an external drum body surface;
   b) an elongated specimen collection tube co-directional with said horizontal longitudinal drum body centerline and having a specimen collection tube port for snug sliding insertion of the elongated specimen collection tip into said specimen collection tube for depositing bodily specimen on said drum body;
   c) a backlight illuminator inside said drum body for backlighting said drum body; and
   d) an elongated scanner outside said drum body and co-extensive therewith for scanning at least some of said backlighted drum body for acquiring a bodily specimen scan.

2. The assay apparatus according to claim 1 and further comprising a reagent dispenser for dispensing a reagent for reacting with bodily specimen such that said elongated scanner acquires a reacted bodily specimen scan.

3. The assay apparatus according to claim 2 wherein said reagent dispenser dispenses at least two reagents for reacting with bodily specimen wherein said reagent dispenser dispenses each reagent pair spaced apart to avoid overlap of adjacent reacted bodily specimens.

4. The assay apparatus according to claim 1 wherein said drum is a rotary drum and said elongated scanner is a stationary line scanner, said drum body is rotatable about said horizontal longitudinal drum body centerline in a predetermined direction and at a predetermined speed of rotation, and further comprising:
   a reagent dispenser co-directional with said horizontal longitudinal drum body centerline and similarly disposed relative to said drum body as said specimen collection tube,
   said reagent dispenser being disposed between said specimen collection tube and said line scanner in said predetermined direction of rotation for dispensing at least one reagent along a reagent dispense line on said drum body,
   the arrangement being such that pursuant to snug sliding insertion of the elongated specimen collection tip into said specimen collection tube, subsequent rotation of said drum body in said predetermined direction of rotation leads to bodily specimen being continuously deposited along a bodily specimen deposit line on said drum body for reaction with said at least one reagent along said reagent dispense line to form a reacted bodily specimen.

5. The assay apparatus according to claim 4 wherein said specimen collection tube includes at least one scraper for scraping bodily specimen from the elongated specimen collection tip on said snug sliding insertion of the elongated specimen collection tip thereinto whereupon bodily specimen gravitates from said at least one scraper for being deposited along a bodily specimen deposit line.

6. The assay apparatus according to claim 5 wherein said at least one scraper has a truncated cone shape for peripherally scraping bodily specimen from a generally cylindrical elongated specimen collection tip on said snug sliding insertion of the elongated specimen collection tip therethrough.

7. The assay apparatus according to claim 4 wherein said specimen collection tube is disposed inside said drum body whereby bodily specimen is deposited on said internal drum body surface.

8. The assay apparatus according to claim 4 wherein said specimen collection tube is disposed outside said drum body whereby bodily specimen is deposited on said external drum body surface and the assay apparatus further includes a cling film dispenser for dispensing cling film on said external drum body surface during said rotation for protecting said line scanner from being daubed by reacted bodily specimen.

9. The assay apparatus according to claim 1 for use with a handheld specimen collection tool having an elongated hollow specimen collection tip with a longitudinal specimen collection tip centerline, the elongated hollow specimen collection tip including an internal peripheral specimen collection tip surface and an external peripheral specimen collection tip surface for bearing bodily specimen therealong, wherein said drum is a rotary drum and said elongated scanner is a stationary line scanner exterior to said drum body,
   said drum body is rotatable about said horizontal longitudinal drum body centerline in a predetermined direction of rotation and at a predetermined speed of rotation,
   said drum body doubles as said specimen collection tube for snug sliding insertion of the elongated hollow specimen collection tip thereinto, and
   said backlight illuminator is simultaneously snugly slidingly inserted into the elongated hollow specimen collection tip on said snug sliding insertion of the elongated hollow specimen collection tip into said drum body.

10. The assay apparatus according to claim 9 wherein said internal drum body surface has a reagent lining including at least one reagent for reacting with bodily specimen on the elongated hollow specimen collection tip's external peripheral specimen collection tip surface on said simultaneous snug sliding insertion of the elongated hollow specimen collection tip into said drum body and said backlight illuminator into the elongated hollow specimen collection tip.

11. The assay apparatus according to claim 9 wherein said elongated hollow specimen collection tip includes an integral reagent dispenser disposed between its internal peripheral specimen collection tip surface and its external peripheral specimen collection tip surface wherein said simultaneous snug sliding insertion of the elongated hollow specimen collection tip into said drum body and said backlight illuminator into the elongated hollow specimen collection tip actuates the integral reagent dispenser to release at least one reagent to react with bodily specimen on the elongated hollow specimen collection tip's external peripheral specimen collection tip surface.

12. The assay apparatus according to claim 1 for use with a handheld specimen collection tool having an elongated hollow specimen collection tip with a longitudinal specimen collection tip centerline, the elongated hollow specimen collection tip including an internal peripheral specimen collection tip surface and an external peripheral specimen collection tip surface for bearing bodily specimen therealong, wherein said drum is a stationary drum and said elongated scanner is a cylindrical scanner surrounding said drum body, said drum body doubles as said specimen collection tube for snug sliding insertion of the elongated hollow specimen collection tip thereinto, and said backlight illuminator is simultaneously snugly slidingly inserted into the elongated hollow specimen collection tip on said snug sliding insertion of the elongated hollow specimen collection tip into said drum body.

13. The assay apparatus according to claim 12 wherein said internal drum body surface has a reagent lining including at least one reagent for reacting with bodily specimen on the elongated hollow specimen collection tip's external peripheral specimen collection tip surface on said simultaneous snug sliding insertion of the elongated hollow specimen collection tip into said drum body and said backlight illuminator into the elongated hollow specimen collection tip.

14. The assay apparatus according to claim 12 wherein the elongated hollow specimen collection tip includes an integral reagent dispenser disposed between its internal peripheral specimen collection tip surface and its external peripheral specimen collection tip surface wherein said simultaneous sliding insertion of said backlight illuminator into the elongated hollow specimen collection tip actuates the integral reagent dispenser to release at least one reagent to react with bodily specimen on the elongated hollow specimen collection tip's external peripheral specimen collection tip surface.

15. A handheld specimen collection tool for use with assay apparatus including:

a drum having a transparent, generally cylindrical, hollow drum body with a horizontal longitudinal drum body centerline, the drum body having an internal drum body surface and an external drum body surface, a backlight illuminator inside the drum body for backlighting the drum body, and an elongated scanner outside the drum body and co-extensive therewith for scanning at least some of the backlighted drum body for acquiring a bodily specimen scan, the handheld specimen collection tool comprising:

(a) a handle; and (b) an elongated hollow specimen collection tip mounted on said handle, said elongated hollow specimen collection tip having a longitudinal specimen collection tip centerline and including an internal peripheral specimen collection tip surface and an external peripheral specimen collection tip surface for bearing bodily specimen therealong the arrangement being such that snug sliding insertion of said elongated hollow specimen collection tip into the drum body, said elongated hollow specimen collection tip deposits bodily specimen on the internal drum surface and the backlight illuminator is simultaneously snugly slidingly inserted into said elongated hollow specimen collection tip such that the backlight illuminator is in intimate contact with said internal peripheral specimen collection tip surface.

16. The handheld specimen collection tool according to claim 15 wherein said elongated hollow specimen collection tip includes an integral reagent dispenser disposed between said internal peripheral specimen collection tip surface and said external peripheral specimen collection tip surface such that said snug sliding insertion dispenses reagent from said integral reagent dispenser for reacting with bodily specimen on said external peripheral specimen collection tip surface.

17. The handheld specimen collection tool according to claim 16 wherein said integral reagent dispenser dispenses at least two reagents wherein said integral reagent dispenser dispenses each reagent pair spaced apart to avoid overlap of adjacent reacted bodily specimens.

\* \* \* \* \*